J. HOFMANN.
PNEUMATIC SPRING FOR VEHICLES.
APPLICATION FILED JUNE 10, 1915.
1,179,182.
Patented Apr. 11, 1916.
2 SHEETS—SHEET 1.
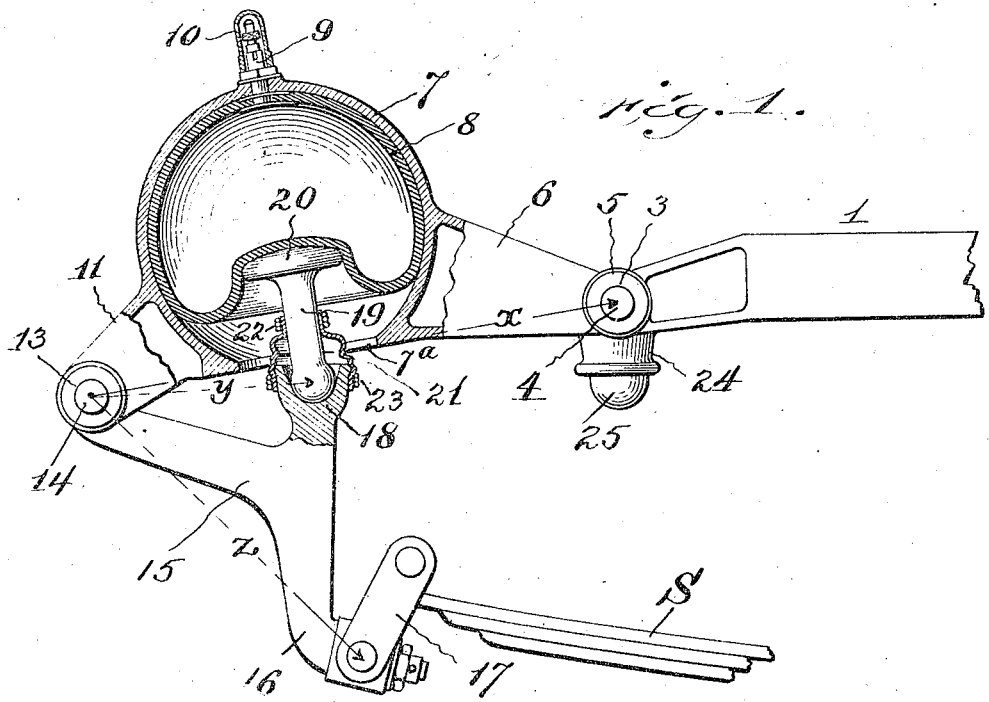
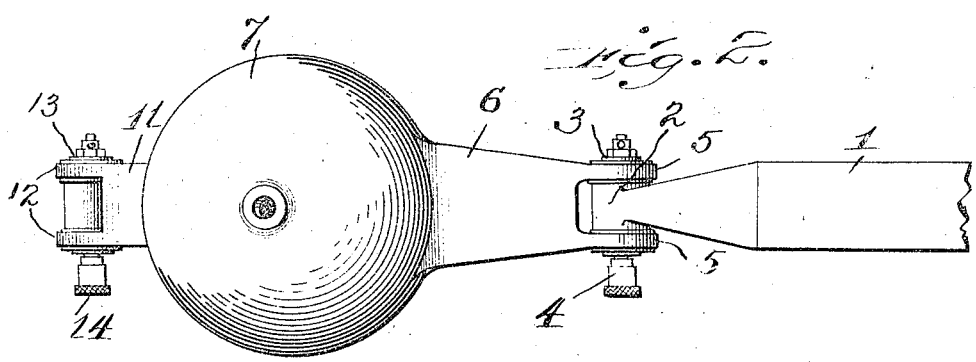
Inventor
Josef Hofmann
By Henry Orth Jr.
Attorney

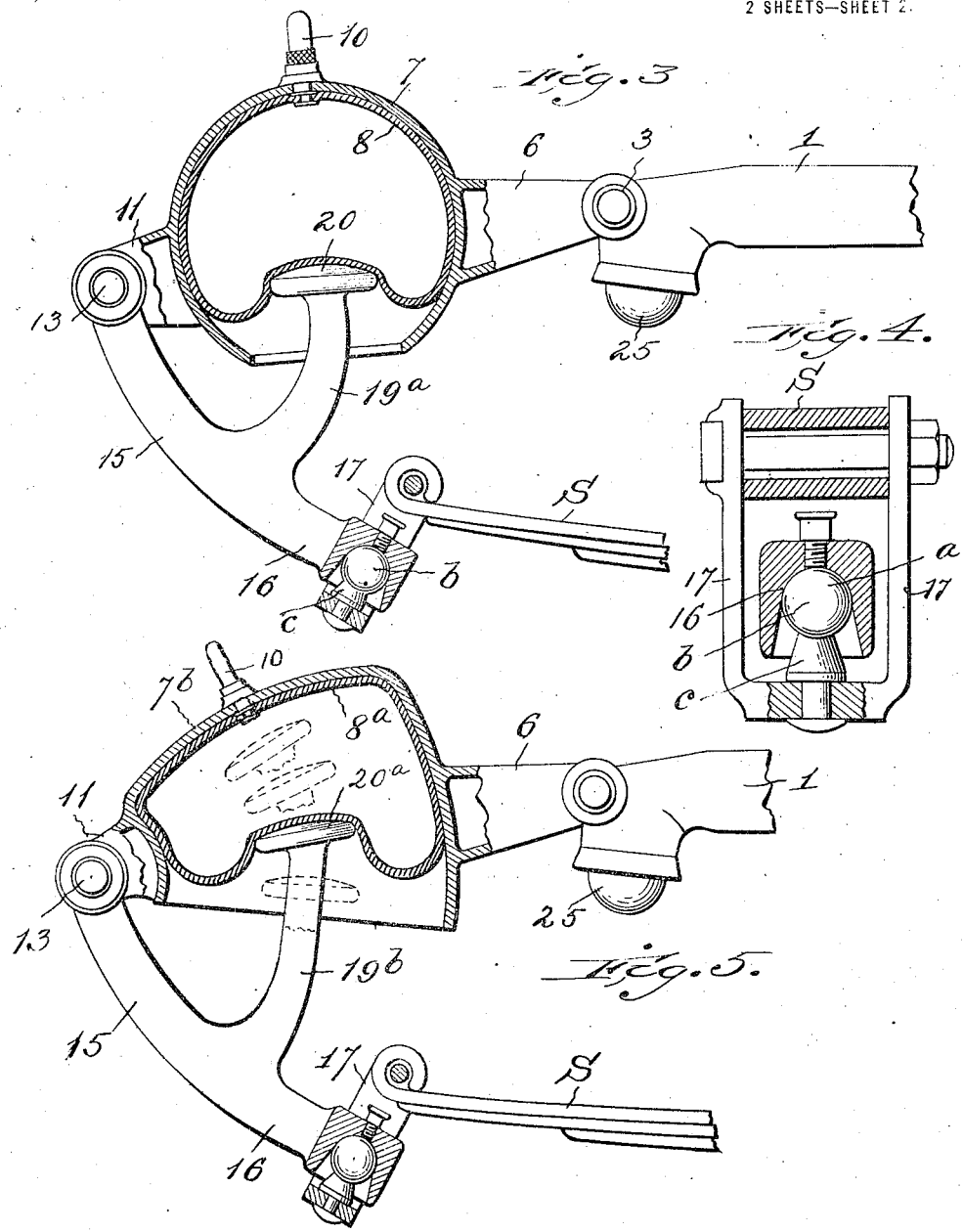

UNITED STATES PATENT OFFICE.

JOSEF HOFMANN, OF BAUMAROCHE, SWITZERLAND.

PNEUMATIC SPRING FOR VEHICLES.

1,179,182.   Specification of Letters Patent.   Patented Apr. 11, 1916.

Application filed June 10, 1915. Serial No. 33,372.

*To all whom it may concern:*

Be it known that I, JOSEF HOFMANN, a citizen of Switzerland, residing at Baumaroche, Switzerland, have invented certain new and useful Improvements in Pneumatic Springs for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to air springs in which there is a plunger element and a cylinder element with a pneumatic cushion which may or may not be inclosed in a sack between them.

The object of the present invention is to provide mechanism whereby one of these elements moves at a greater speed than the other, and, preferably, in substantially changing ratio with respect to the other, whereby I obtain an easy cushioning of the vehicle. In order to accomplish this I preferably construct the air spring in such a manner that one element is movable with respect to the member of the vehicle to which it is connected, and the other element is also movable with respect to the member of the vehicle to which it is connected, and both elements change their relative movement with respect to one another, and to this end I proportion the lever arms of one element to the other so as to control the degree and rate of compression.

In order that my invention may be more readily understood, reference will be had to the accompanying drawings which show one of the many structures which I have used that embody my invention, and in which—

Figure 1 is a side elevation, partly in section; Fig. 2 is a plan view thereof. Fig. 3 is a modification showing the plunger rod rigidly connected to its lever. Fig. 4 is a detail sectional view showing the joint connecting one of the levers to the vehicle spring; and Fig. 5 illustrates a further modification in which the cylinder is curved to conform to the path of the plunger.

Referring to Figs. 1 and 2, this device comprises a bar or member 1, which may be of any desired length, and which is arranged for connection to the body or frame of a motor vehicle. The length of this bar will depend entirely upon the shape of the overhang of the body and the length of the leaf spring, and it will be cut to the length required when it is placed on the car. The projecting end of this bar has an eye 2 provided with a pivot 3 having a grease cup 4. The pivot 3 passes through the forked end 5 of an arm 6 connected to or forming part of a spherical member or cylinder 7 inclosing a flexible diaphragm or pneumatic sack 8 provided with a pneumatic inflating valve 9 projecting through the spherical member 7 and provided with a dust cap 10, or otherwise. Any suitable type of valve construction may be used. There is also a second arm 11 projecting from the spherical member or cylinder 7, whose forked end 12 (Fig. 2) is provided with a pivot pin 13, and grease cup 14, for connection to a bell-crank lever 15. This bell crank lever 15 has an arm 16 connected by a shackle 17 to an element of the running gear of the vehicle, for example, to one end of the vehicle spring S, preferably in the manner shown in Fig. 4, where the end of the lever 16 is provided with a ball seat *a* in which seats the ball-shaped end *b* of a pin *c* whereby universal movement is permitted between the end of lever 16 and the shackle 17.

The bell-crank lever 15 is also provided with a pivot point 18 for the end of a plunger 20 that coöperates with the cylinder member 7 and acts on the sack or diaphragm.

It will be noted that the spherical cylinder element 7 incloses a spherical pneumatic sack 8 acted upon by a plunger 20 of less diameter than said element, which plunger passes through an opening 7ª in the end of the element 7. In this example the plunger is maintained centrally of the cylinder solely by the air pressure within the sack, which sack is caused by the air pressure to belly beneath and around the plunger as the plunger enters the cylinder. And in this particular instance I prefer to use a ball and socket joint at the pivot point 18 instead of a rocking pivot, as it is easier to lubricate, and will retain the lubricant for a greater length of time. In order to cover this joint and protect it from dust and dirt, I secure the upper end of a tubular leather washer 21 to the plunger rod 19 by means of a few wraps of wire 22, and in a similar manner wrap the lower end of this tube with wire 23 to connect it to the exterior of the socket at 18.

On the eye 2 of the bar 1 I provide a support 24 for a rubber or other buffer 25, in case an exceptionally great shock be imparted to the running gear, or wheels of the vehicle, against which buffer the springs S will strike.

The operation is as follows: When shock is imparted to the running gear of a vehicle, causing the springs S to move upward, motion is imparted to the lever 15 to swing it on pivot 13, and at the same time the spherical cylinder member 7 moves upward about its pivot 3 but at a less speed than the speed of the plunger 20, so that as both plunger and cylinder move upward, compression is produced within the sack 8. The difference in speed between the two movements, which determines the extent of compression, is dependent upon a lever arm $x$ extending between points 3 and 13 and composed of members 11, 7 and 6; lever arm $y$ between the points 14 and 18, and a lever arm $z$ between the point 14 and the connection of arm 16 with the shackle 17. The rate of compression may be altered by changing the relative lengths of these lever arms. When the spring S returns to normal position all the lever arms, $x$ $y$ and $z$ swing downward about the pivot point 5, the lever 15 moving in such manner as to cause the plunger 20 to move faster than the cylinder 7, and is assisted in moving out of the cylinder 7 by the force of the compressed air in the sack 8.

It is obvious that the device may be inverted and the cylinder member 7 be connected to a running gear element and the lever 1 to the body or frame of the vehicle.

It will be noted that as the spring S moves up there is a slower speed for the plunger 20, and this speed ratio will depend on the ratio of the effective lever arms $y$ to $z$, as well as on the normal inclination of these lever arms, because they move about a pivot, and the leverage changes as they deviate from a horizontal. The speed of cylinder 7 is also different from that of spring S and of the plunger 20 and is slower than the speeds of both the spring and the plunger, and the speed ratio is dependent upon the ratio of the effective lever arms $y$ to $z$, their inclinations, and the inclination of $x$. The two speed ratios are different and constantly changing.

In the two modifications shown in Figs. 3 and 4, I have shown structures in which the joint between the plunger piston 19 and bell-crank lever at 18 is omitted. The plunger rod $19^a$ is slightly curved and rigidly connected to said bell-crank lever, thus dispensing with a joint that has to be lubricated.

In Fig. 5 the cylinder member $7^b$ is not spherical, and its walls are curved so as to be concentric, or substantially concentric with the center about which the plunger rotates, namely the pivot point at 13. The plunger stem $19^b$ is similarly curved and carries the plunger $20^a$ slightly tilted on the end of said stem, so as to give proper action on the sack $8^a$, which is constructed to conform to the shape of the cylinder element $7^b$.

I claim—

1. In a vehicle spring, the combination of two levers pivoted together, one of said levers pivotally connected to the vehicle frame and the other pivotally connected to a running gear element, a spring between the levers, said levers arranged for simultaneous movement in the same direction at different speeds depending upon the variation of said spring and under all conditions of operation.

2. In a vehicle spring, the combination of two levers pivoted together at their ends, one of said levers also pivotally connected to the vehicle frame and the other to a running gear element, a spring between said two levers, said levers arranged to move simultaneously in the same direction with the vertical movements of the running gear element but at different rates of movement.

3. In a vehicle spring, the combination with a pivoted spherical cylinder element, a plunger and plunger stem and a pneumatic sack between said element and plunger; of a lever pivoted to said spherical cylinder element rigidly supporting the plunger stem and pivotally connected to a running gear element, the distance between the pivot point of said lever with said cylinder element, and the point of support for said plunger rod being less than the distance between said pivot point and the point of connection with the running gear element.

4. A vehicle spring comprising two elements, a cylinder element and a plunger element, and a pneumatic sack between them, a lever pivotally connected to said cylinder element and supporting said plunger element, means for pivotally connecting the cylinder element to a vehicle part, and means for pivotally connecting said lever to a second vehicle part, said vehicle parts being movable relatively one to the other.

5. A vehicle spring comprising two elements, a cylinder element and a plunger element, and a pneumatic sack between them, a lever pivotally connected to said cylinder element and supporting said plunger element, means for pivotally connecting the cylinder element to a vehicle part, and means for pivotally connecting said lever to a second vehicle part, said vehicle parts being movable relatively to one another, the distance on said lever between its pivot point and the point of support of said plunger differing from the distance from said pivot point to the point of connection with said second vehicle part.

6. A vehicle spring comprising two elements, a cylinder element and a plunger element, and a pneumatic sack between them, a lever pivotally connected to said cylinder element, said lever rigidly connected to said plunger element, means for pivotally connecting the cylinder element to a vehicle part, and means for pivotally connecting said lever to a second vehicle part, said vehicle parts being movable relatively one to the other, the distance on said lever between its pivot point and the point of support of said plunger differing from the distance from said pivot point to the point of connection with said second vehicle part.

7. A vehicle spring comprising two elements, a curved cylinder element and a plunger element, and a pneumatic sack inclosed between them, a lever pivotally connected to said cylinder element, a curved plunger rod rigidly connecting said plunger and lever, means for pivotally connecting the cylinder element to a vehicle part and means for pivotally connecting said lever to another vehicle part movable relatively to the first vehicle part.

8. A vehicle spring comprising two elements, a curved cylinder element and a plunger element, and a pneumatic sack inclosed between them, a lever pivotally connected to said cylinder element, a plunger rod rigidly connecting said plunger and lever, means for pivotally connecting the cylinder element to a vehicle part and means for pivotally connecting said lever to another vehicle part movable relatively to the first vehicle part.

9. In a vehicle spring, the combination with a cylinder member and a coöperating piston member of an air spring; of means to movably connect the cylinder member to a vehicle frame, and means to movably connect the piston member to a running gear element of the vehicle and to the cylinder element, said connections permitting simultaneous bodily movement of said elements with respect to said frame and running gear element in the same direction but at different rates.

10. In a vehicle spring, the combination with two levers of different lengths pivotally connected together and forming an acute angle between them; of a spring included between the levers in said angle one of said levers arranged for pivotal connection to the vehicle body and the other lever arranged for pivotal connection with the running gear member of the vehicle.

11. In a vehicle spring, the combination with two levers of different lengths pivoted together at an acute angle; of a spring included in the angle between said levers, said levers arranged for connection to the body member and a running gear member of a vehicle, one of said levers having pivotal connection with one of said members, and the other lever having a connection permitting simultaneous movement in substantially rectangular directions.

12. In a vehicle spring, the combination with two levers of different lengths pivoted together at an acute angle and arranged for connection to different members of a vehicle; of a spring included in the angle between said levers, one of said levers directly pivoted to one of said vehicle members and a shackle interposed between the other lever and another member of the vehicle.

13. In a vehicle spring, the combination with two levers of different lengths pivotally connected together, an air spring included between the levers, one of said levers arranged for pivotal connection to a vehicle body and the other to a running gear element, and both levers moving in the same direction under all conditions of operation to vary the angle between them.

14. In a vehicle spring the combination with two levers pivotally connected together at an angle to one another, one of said levers arranged to be pivoted to the vehicle frame and the other arranged to be pivoted to a running gear element of the vehicle, both of said levers arranged for simultaneous movement in the same direction at different rates under all conditions of operation, and a spring controlling said rate of movement of one lever to and from the other according to the load during said simultaneous movement of the levers.

15. In a vehicle spring the combination with two levers pivotally connected together, one of said levers arranged for pivotal connection to a vehicle body and the other arranged for connection to a running gear element, said points of connection being offset from one another horizontally and both levers arranged for simultaneous movement in the same direction under all conditions of operation, and a spring controlling the rate of movement of one lever to and from the other according to the load during said simultaneous movement of the levers.

In testimony that I claim the foregoing as my invention, I have signed my name in presence of two subscribing witnesses.

JOSEF HOFMANN.